Figure 1:
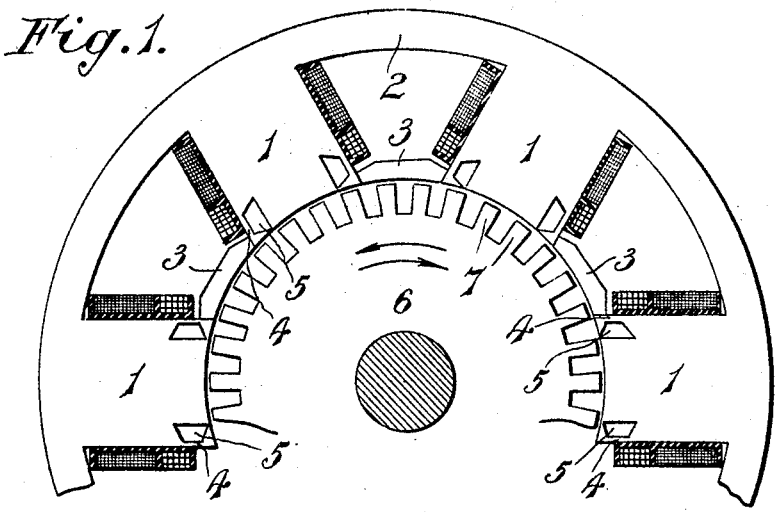

No. 795,481. PATENTED JULY 25, 1905.
H. CHITTY.
DYNAMO ELECTRIC MACHINE.
APPLICATION FILED APR. 11, 1905.

WITNESSES: INVENTOR.

UNITED STATES PATENT OFFICE.

HENRY CHITTY, OF LONDON, ENGLAND.

DYNAMO-ELECTRIC MACHINE.

No. 795,481.        Specification of Letters Patent.        Patented July 25, 1905.

Application filed April 11, 1905. Serial No. 255,035.

*To all whom it may concern:*

Be it known that I, HENRY CHITTY, a subject of the King of Great Britain, residing at 2 Norfolk street, Strand, London, England, have invented a new and useful Improvement in Dynamo-Electric Machines, of which the following is a specification.

This invention relates to electric machines generally—such as generators, motors, rotary transformers, and the like—and has for its object to provide improved means for controlling the distribution of the magnetic flux in the space embraced between the leading and trailing horns of adjacent pole-pieces so as to secure a fixed position for the brushes and sparkless commutation over a much greater range of loads than has hitherto been possible.

With this object in view according to the present invention a bridge-piece of magnetic material is provided, extending between adjacent pole-tips, furnishing a shunt-path for the magnetic flux. By this means a strong magnetizing force may be concentrated upon a portion of the magnetic circuit at or near the leading horn, so that at no load this portion will be so highly saturated as to be practically incapable of any substantial increase in saturation. Hence any additional magnetomotive forces coming into play at full load, whether due to the shunt or the series windings on the poles or to the cross-magnetizing effect of the current flowing in the armature-conductors, will not appreciably increase the magnetic flux at this point. For example, in a machine with the well-known radial type multipolar field-magnet, designed to operate as direct-current generator, with predetermined direction of rotation, I construct the field-magnet with a bridge extending from the leading horn of one pole to the trailing horn of the next, thus forming a closed magnetic shunt-circuit, in which is included a contracted neck formed in the leading side of the pole. Upon this neck, which is also in the circuit of the effective flux at the leading horn, the combined magnetizing forces of the windings upon the two poles, acting in the closed circuit, may be concentrated.

The neck may be formed in any convenient manner—as, for example, by piercing the pole in a direction transverse to the line of rotation, with a suitably-shaped hole extending to within a very short distance of the pole-face. Such proportions in regard to length and cross-section may be given to this neck that, although a stronger magnetomotive force will be acting in it than in any other portion of the magnetic circuit, raising it to a very high degree of saturation, the actual amount of flux need not be great.

The bridge is made, preferably, of a material having good magnetic permeability, and in machines which are sometimes required to be capable of operation in either direction—as, for example, in traction-motors—it is desirable that the point of commutation should be central in regard to adjacent pole-tips and the flux symmetrically disposed on either side remain practically constant for all loads, to secure which the cross-section of the bridge is made bilaterally symmetrical and a hole pierced in each of the pole-tips. A contracted neck at each end of the bridge is thus included in the closed magnetic circuit as well as in the circuit of the effective flux at the pole-tips, and both necks will become saturated at light loads and the effective flux will remain constant.

The bridge-piece is preferably pierced by ventilation-passages extending in lines parallel to the direction of rotation—that is, from pole to pole—so as to offer no obstruction to the escape of air issuing from the ventilation-ducts provided in the armature.

The invention is illustrated, for example, in the accompanying drawings, in which—

Figure 2:
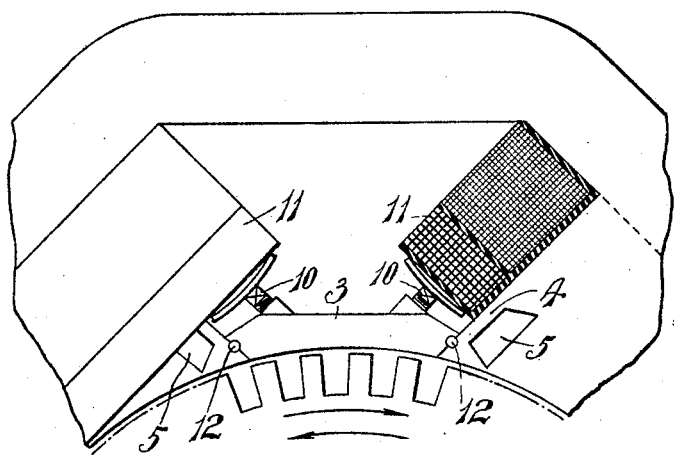
Figure 3:
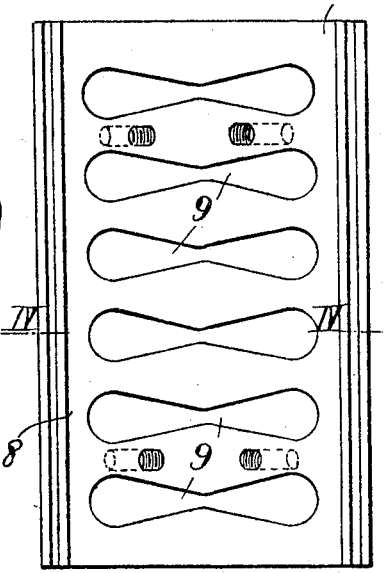
Figure 4:
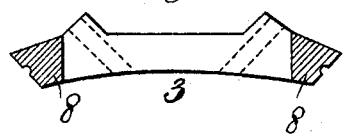

Figure 1 is a diagrammatic representation of an electric machine adapted to rotate in opposite directions at will. Fig. 2 is a view showing one form of bridge-piece in position between the poles of such a machine. Fig. 3 is a plan of the bridge-piece shown in Fig. 2, looking in an upward direction and showing the ventilating-passages provided therein. Fig. 4 is a section on the line IV IV of Fig. 3.

Referring to Fig. 1, the pole-pieces of the machine are indicated at 1, and the yoke connecting them at 2. The bridge-piece extending between the pole-tips is shown at 3, and the contracted neck 4 is formed in both sides of the pole-pieces by means of a slot 5, extending partly or entirely through the pole-piece in a direction transverse to the direction of rotation. The armature-core is indicated at 6 and shown here as being provided with teeth 7, the arrows indicating that the direction of rotation of the armature may be reversed. As will be seen, the bridge-piece has substantially the same cross-section at either end.

A convenient form which the bridge-piece may take is illustrated in Figs. 2, 3, and 4. The shape of the cross-section of this bridge-piece at the center is substantially symmetrical, but greater in dimension than the effective cross-section toward the ends 8, being gradually reduced, as shown in Fig. 4. Ventilating-passages 9 are provided in the body of the bridge-piece, and the reduction in cross-section may also be effected by making these ventilating-passages to increase in area as they approach the ends of the pole-piece. Either or both of these means may be employed for regulating the cross-section or any other suitable means which will effect the same purpose. The bridge-piece may be maintained in position by means of screws or wedges 10, bearing against the field-coils 11 of the machine in combination with dowel-pins or screws 12, located at the junction of the bridge and pole pieces.

It will be obvious that the bridge-piece may be formed in one with the pole-pieces, if desired, and other modifications as to shape and construction both of the pole and bridge pieces may be made without departing from the spirit and scope of the invention. The invention is also not dependent upon there being windings on the poles, as an electric machine constructed in accordance with this invention is capable of operating satisfactorily as a motor without any field-magnet windings whatever, the armature exciting its own field.

I claim as my invention—

1. In a dynamo-electric machine having radial pole-pieces the combination with a pole-piece having a portion removed from both its sides in a direction transverse to that of rotation of the revolving member of the machine, of a bridge-piece of magnetic material extending between adjacent pole-pieces and forming a shunt-path for the magnetic flux.

2. In a dynamo-electric machine having projecting pole-pieces the combination with a pole-piece having a portion removed from both its sides in a direction transverse to that of rotation of the revolving member of the machine, of a bridge-piece of magnetic material extending between the extremities of adjacent pole-pieces and forming a shunt-path for the magnetic flux.

3. In a dynamo-electric machine having projecting pole-pieces the combination with a pole-piece having portions at both sides in a direction transverse to that of rotation of the revolving member of the machine removed therefrom thereby forming contracted necks in the pole-piece adjacent to the tips of the pole-piece, of a bridge-piece of magnetic material extending between adjacent pole-pieces and forming a shunt-path for the magnetic flux.

4. In a dynamo-electric machine having projecting pole-pieces the combination with a pole-piece having portions at both sides in a direction transverse to that of rotation of the revolving member of the machine removed therefrom thereby forming contracted necks near both tips of the pole-pieces, of a bridge-piece of magnetic material extending between the tips of adjacent pole-pieces and forming a shunt-path for the magnetic flux.

5. In a dynamo-electric machine having radial pole-pieces the combination with a pole-piece pierced with holes in a direction transverse to that of rotation of the revolving member of the machine forming contracted necks adjacent to both tips of the pole-piece, of a bridge-piece of magnetic material extending between adjacent pole-pieces and forming a shunt-path for the magnetic flux.

6. In a dynamo-electric machine having projecting pole-pieces the combination with a pole-piece pierced with holes in a direction transverse to that of rotation of the revolving member of the machine forming contracted necks near both tips of the pole-pieces, of a bridge-piece of magnetic material extending between the extremities of adjacent pole-pieces and forming a shunt-path for the magnetic flux.

7. In a dynamo-electric machine having projecting pole-pieces the combination with a pole-piece having a portion at both of its sides in a direction transverse to that of rotation of the revolving member of the machine removed therefrom, of a bridge-piece of magnetic material and bilaterally-symmetrical transverse cross-section extending between adjacent pole-pieces and forming a shunt-path for the magnetic flux.

8. In a dynamo-electric machine having projecting pole-pieces the combination with a pole-piece pierced with holes in a direction transverse to that of rotation of the revolving member of the machine forming contracted necks adjacent to both tips of the pole-piece of a bridge-piece of magnetic material and bilaterally-symmetrical transverse cross-section extending between the tips of adjacent pole-pieces and forming a shunt-path for the magnetic flux.

9. In a dynamo-electric machine having radial pole-pieces the combination with a pole-piece having portions removed therefrom in a direction transverse to that of rotation of the revolving member of the machine, of a bridge-piece of magnetic material extending between adjacent pole-pieces and forming a shunt-path for the magnetic flux, said bridge-piece being provided with ventilation-ducts.

10. In a dynamo-electric machine having projecting pole-pieces the combination with a pole-piece pierced with holes in a direction transverse to that of rotation of the revolving member of the machine and forming contracted necks near both tips of the pole-piece of a bridge-piece of magnetic material and bilaterally-symmetrical transverse cross-section extending between the tips of adjacent pole-pieces and forming a shunt-path for the magnetic flux, said bridge-piece being provided with ventilation-ducts.

11. In a dynamo-electric machine having projecting pole-pieces the combination with a pole-piece pierced with holes in a direction transverse to that of rotation of the revolving member of the machine and forming contracted necks near both tips of the pole-pieces of a bridge-piece of magnetic material and bilaterally-symmetrical transverse cross-section extending between the tips of adjacent pole-pieces and forming a shunt-path for the magnetic flux, said bridge-piece being provided with ventilation-channels in the form of slots extending in a direction from one pole-piece to the next.

In testimony whereof I have signed my name to this specification, in the presence of two subscribing witnesses, this 27th day of February, 1905.

HENRY CHITTY.

Witnesses:
A. A. BERGIN,
W. J. SKERTEN.